United States Patent
Butler et al.

(10) Patent No.: US 9,460,310 B2
(45) Date of Patent: Oct. 4, 2016

(54) METHOD AND APPARATUS FOR SUBSTITUTION SCHEME FOR ANONYMIZING PERSONALLY IDENTIFIABLE INFORMATION

(71) Applicant: PathAR, Inc., Colorado Springs, CO (US)

(72) Inventors: Patrick David Butler, Highlands Ranch, CO (US); Tony Brett Marshall, Leawood, KS (US); Mark F. Jacobson, Lone Tree, CO (US)

(73) Assignee: PATHAR, INC., Colorado Springs, CO (US)

(*) Notice: Subject to any disclaimer, the term of this patent is extended or adjusted under 35 U.S.C. 154(b) by 369 days.

(21) Appl. No.: 13/842,242

(22) Filed: Mar. 15, 2013

(65) Prior Publication Data

US 2014/0280261 A1    Sep. 18, 2014

(51) Int. Cl.
*G06F 17/30* (2006.01)
*G06F 21/62* (2013.01)

(52) U.S. Cl.
CPC ....... *G06F 21/6254* (2013.01); *G06F 21/6245* (2013.01)

(58) Field of Classification Search
CPC ............. G06Q 30/02; G06Q 30/0269; G06Q 30/0255; G06Q 30/0275; G06Q 50/22; G06Q 50/01; G06Q 20/383; G06Q 10/107; G06Q 40/08; G06Q 20/206; G06Q 20/4014; G06Q 30/0258; G06Q 30/0277; G06F 21/6245; G06F 21/6254
USPC ........................................................ 707/756
See application file for complete search history.

(56) References Cited

U.S. PATENT DOCUMENTS

| | | | |
|---|---|---|---|
| 5,987,508 A * | 11/1999 | Agraharam | H04L 29/12594 379/93.24 |
| 6,463,533 B1 | 10/2002 | Calamera et al. | |
| 6,496,931 B1 | 12/2002 | Rajchel et al. | |
| 7,143,091 B2 * | 11/2006 | Charnock | G06F 17/30716 707/999.005 |
| 7,930,252 B2 | 4/2011 | Bender et al. | |
| 8,364,969 B2 * | 1/2013 | King | G06F 21/6254 713/182 |
| 8,468,271 B1 | 6/2013 | Panwar et al. | |
| 9,215,072 B1 * | 12/2015 | Barton | H04L 9/3226 713/168 |
| 2002/0152272 A1 * | 10/2002 | Yairi | G06Q 10/107 709/206 |
| 2002/0173994 A1 * | 11/2002 | Ferguson, III | G06Q 20/04 705/4 |

(Continued)

OTHER PUBLICATIONS

McCallister et al. Guide to Protecting the Confidentiality of Personally Identifiable Information (PII): Recommendations of the National Institute of Standards and Technology, NIST Special Publication 800-122, Natl. Inst. Stand. Technol. Spec. Publ. 800-122, 59 pages (Apr. 2010) (http://csrc.nist.gov/publications/nistpubs/800-122/sp800-122.pdf).*

(Continued)

*Primary Examiner* — Phong Nguyen
(74) *Attorney, Agent, or Firm* — Kilpatrick Townsend & Stockton LLP (57) ABSTRACT

In some embodiments, a system includes a software program capable of performing an aliasing function on the personally identifiable information ("PII") of a subject. The software can associate the alias with the PII, and output the alias rather than the PII.

20 Claims, 8 Drawing Sheets

(56) References Cited

U.S. PATENT DOCUMENTS

| | | | |
|---|---|---|---|
| 2005/0154913 A1* | 7/2005 | Barriga | G06F 21/33 726/4 |
| 2007/0168283 A1* | 7/2007 | Alvarez | G06Q 20/1085 705/43 |
| 2008/0147554 A1* | 6/2008 | Stevens | G06F 19/322 705/51 |
| 2008/0195694 A1* | 8/2008 | Alaniz | H04L 41/5064 709/203 |
| 2010/0027780 A1 | 2/2010 | Jung et al. | |
| 2010/0138774 A1* | 6/2010 | Crosbie | G01N 35/00722 715/780 |
| 2011/0010563 A1* | 1/2011 | Lee et al. | 713/189 |
| 2011/0191394 A1* | 8/2011 | Winteregg | G06F 17/30 707/822 |
| 2012/0266250 A1 | 10/2012 | Uhl | |
| 2012/0330819 A1* | 12/2012 | Weinflash | G06Q 40/02 705/38 |
| 2013/0006824 A1* | 1/2013 | Maisonneuve | G06Q 30/0241 705/35 |
| 2013/0018787 A1* | 1/2013 | Andrews | G06Q 20/1085 705/43 |
| 2013/0138698 A1 | 5/2013 | Harada et al. | |
| 2013/0185293 A1* | 7/2013 | Boback | G06F 17/3053 707/728 |
| 2013/0226949 A1* | 8/2013 | Ogilvie | G06F 17/30283 707/758 |
| 2014/0114855 A1* | 4/2014 | Bajaj | G06Q 20/20 705/44 |
| 2015/0341327 A1* | 11/2015 | Barton | H04L 9/3226 713/168 |

OTHER PUBLICATIONS

International Search Report and Written Opinion, Application No. PCT/US2014/022718, Sep. 15, 2014 (13 pages).

* cited by examiner

FIG. 1

PII Table 200

| Record 202 | Name 1 204 | Name 2 206 | Email Address 208 | Account Handle 210 |
|---|---|---|---|---|
| 1 | Sahil | - | SuperM1@isp1.com | Superman |
| 2 | Sue | Colins | suecolins@isp2.com | - |
| 3 | Chris | Fritz | C2F@isp3.com | DeepCover |
| 4 | Tom | Johnson | - | TomJ |
| 5 | - | - | - | Freelander |
| 6 | - | - | angelswings@isp4.com | |
| ... | ... | ... | ... | ... |
| N | A | B | C | D |

FIG. 2A

Name Alias Table 220

| Record 222 | Name Alias 224 |
|---|---|
| ... | ... |
| 26 | jackie.howe.78341 |
| ... | ... |
| 103 | peter.talis.09163 |
| ... | ... |
| 560 | raj.gupta.93279 |
| ... | ... |
| 892 | l.schmidt.54781 |

FIG. 2B

Subset Name Table 230

| Record 232 | Potential Alias Name 234 |
|---|---|
| 5 | Ann |
| 36 | Audrey |
| 52 | Becky |
| 84 | Cathy |
| 130 | Deborah |
| 198 | Evelyn |
| 437 | Jackie |
| 691 | Melissa |
| 954 | Samantha |

FIG. 2C

Email Address Alias Table 240

| Record 242 | Email Alias 244 |
|---|---|
| 15 | z.todd.58423@isp4.com |
| 627 | raj.gupta.93279@isp1.com |
| 740 | l.schmidt.54781@isp3.com |
| 745 | jackie.howe.78341@isp2.com |

FIG. 2D

Account Handle Alias Table 250

| Record 252 | Account Handle Alias 254 |
|---|---|
| 154 | PeterPan96472 |
| 368 | StarWars58331 |
| 691 | BigDog63745 |
| 1211 | TwinkleToes42315 |

FIG. 2E

Key Table 260

| Record 262 | PII 264 | Name Alias 266 | Email Alias 268 | Account Handle Alias 270 |
|---|---|---|---|---|
| ... | ... | ... | ... | ... |
| 67 | 3 | 892 | 740 | 1211 |
| ... | ... | ... | ... | ... |
| 93 | 6 | - | 15 | - |
| ... | ... | ... | ... | ... |
| 427 | 1 | 560 | 627 | 691 |
| ... | ... | ... | ... | ... |
| 690 | 4 | 103 | - | 368 |
| ... | ... | ... | ... | ... |
| 841 | 2 | 26 | 745 | - |
| ... | ... | ... | ... | ... |
| 1296 | 5 | - | - | 154 |

METHOD AND APPARATUS FOR SUBSTITUTION SCHEME FOR ANONYMIZING PERSONALLY IDENTIFIABLE INFORMATION

BACKGROUND

Some embodiments relate to anonymizing personally identifiable information. In particular, but not by way of limitation, some embodiments relate to systems and methods for substituting aliased information for personally identifiable information.

Personally identifiable information ("PII") is used in many areas, including marketing and government analysis. In some instances it is desirable for PII to be anonymized. Currently, the available solutions suffer from significant shortfalls.

One known option is to simply not use the PII data. An evident shortfall of this option is that the data is not available for use. This option can have serious repercussions because in many cases, the information is not available in any other form. Despite the repercussions, however, this option is often taken to ensure protection of PII.

A second known option is to redact enough PII to ensure that a subject cannot be identified. Redaction involves removing significant portions of the information, which is then no longer available for analysis or use. While the data can be analyzed, many other useful functions cannot be performed. For example, a user analyzing data that has redacted name information cannot identify potentially significant patterns because the name information is completely unavailable. If the same name would have appeared in eight different places, no way exists for the analyst to recognize that pattern. An additional shortfall of redaction is that the PII cannot be retrieved. In redaction, once the information is redacted it becomes irretrievable.

A third known option is to encrypt the PII. With encrypted PII, analysis can be performed, patterns can be identified, and PII can be retrieved. An issue with identifying patterns is that encrypted data looks unrecognizable to a human. For example, the name "John Smith" may be encrypted into "S6!FG09Q." It is difficult for a human to recognize patterns when the patterns are random sequences of characters. Also, encryption can be broken, and it is particularly easy to decrypt short pieces of information. For instance, PII that is only 4 characters (e.g., the last four digits of a telephone number) cannot be securely encrypted. With a typical hashing system, a 4 character value can be relatively easily decrypted.

Although present devices are functional, they are not sufficiently accurate or otherwise satisfactory. Accordingly, a system and method are needed to address the shortfalls of the present technology and to provide other new and innovative features.

SUMMARY

In some embodiments, a system includes a software program capable of performing an aliasing function on the personally identifiable information ("PII") of a subject. The software can associate the alias with the PII, and output the alias rather than the PII.

DETAILED DESCRIPTION

In some embodiments, a non-transitory processor-readable medium stores code representing instructions for execution by a computer processor. The instructions cause the processor to perform an aliasing function on personally identifiable information ("PII") of a subject to produce an alias, associate the alias with the PII, and output the alias rather than the PII. Similarly stated, execution of the code stored on the non-transitory processor-readable medium can produce an alias for the PII and store the PII with the alias. The system can then output the alias, thereby protecting the PII.

Another illustrative embodiment is a method for anonymizing a subject's name. The method includes selecting a subset of predefined name aliases for a name of a subject. The subset of predefined name aliases can be based on known or inferred characteristics of the subject. The method can also include randomly choosing a name alias from the subset of predefined name aliases. To ensure uniqueness, a randomly-generated numeric or alphanumeric value can be appended to the chosen name alias. The name alias can be output rather than the name of the subject.

Another illustrative embodiment is a method for deanonymizing personally identifiable information. The method includes receiving an alias and an authorization code. The authorization code can be validated to ensure the user has authority to retrieve the personally identifiable information associated with the alias. If the authorization code properly validates, the personally identifiable information can be output. Similarly stated, PII associated with a supplied alias can be retrieved and output to a user with proper authorization when the user requests the PII.

As used herein, the term personally identifiable information ("PII") refers to information about a subject that can be used to identify the subject. For example, the subject's name, address, social security number, email address, account handle, company identification number, or telephone number can be used to identify a subject. A subject's age or gender, however, on its own cannot be used to identify the subject.

As used herein, the singular forms "a," "an" and "the" include plural referents unless the context clearly dictates otherwise. Thus, for example, the term "a database" is intended to mean a single database or multiple databases.

As used herein, a module can be, for example, any assembly and/or set of operatively-coupled electrical components associated with performing a specific function, and can include, for example, a memory, a processor, electrical traces, optical connectors, software (stored in memory and/ or executing in hardware) and/or the like.

Figure 1:
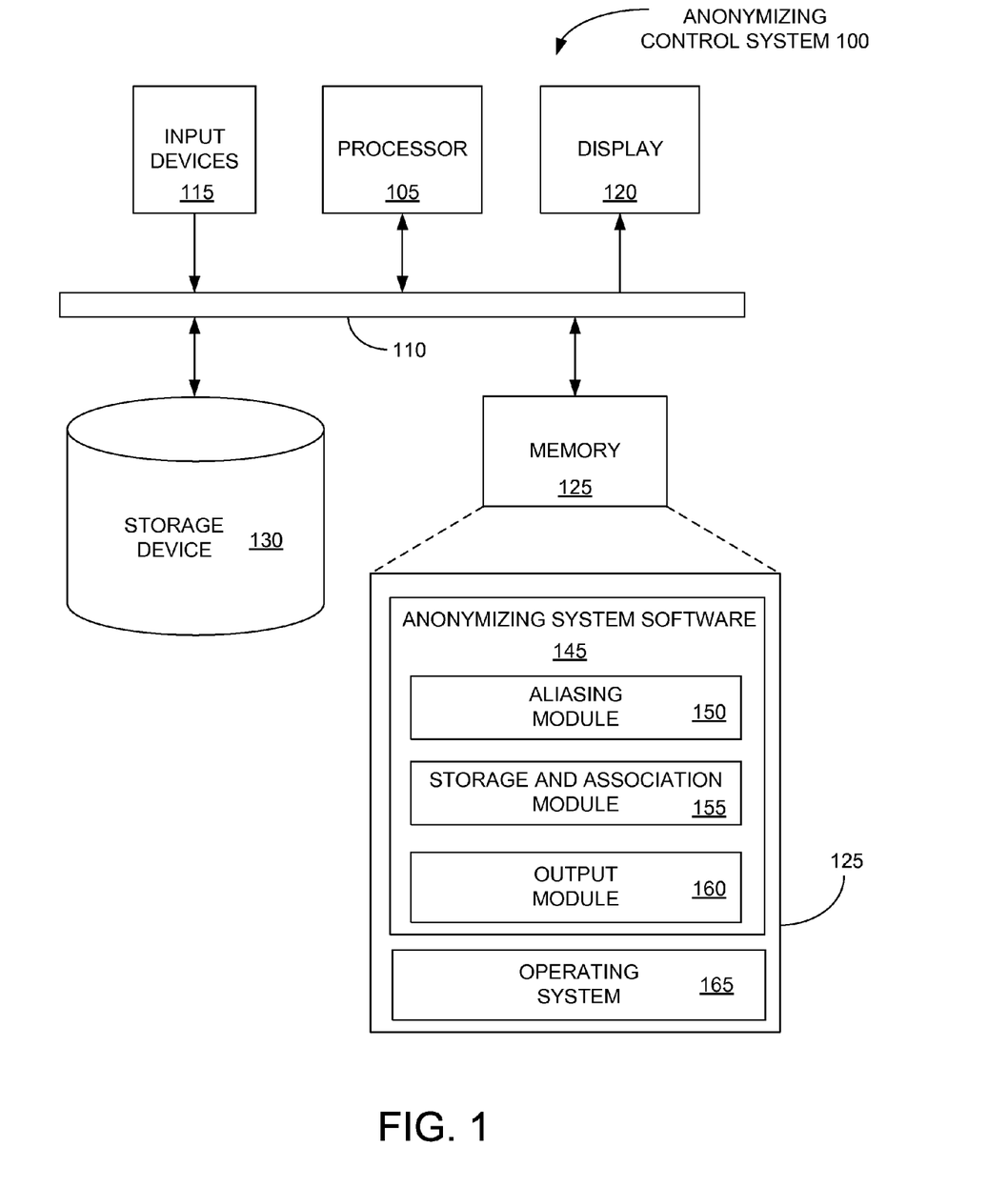
FIG. 1 illustrates a functional block diagram of an anonymizing control system, according to an illustrative embodiment.

FIG. 1 illustrates a functional block diagram of an anonymizing control system 100, according to an embodiment.

Anonymizing control system 100 can include a data bus 110 for communication between processor 105, input devices 115, display 120, memory 125, and storage 130. While FIG. 1 depicts only a single processor 105, multiple processors, a multi-core processor, or multiple multi-core processors may be present in some embodiments. The processor 105 can be a general purpose processor, a Field Programmable Gate Array ("FPGA"), an Application Specific Integrated Circuit "ASIC"), a Digital Signal Processor ("DSP"), and/or the like. The processor 105 can be configured to run and/or execute application authorization processes and/or other modules, processes and/or functions associated with anonymizing control system 100.

Additionally, the components on anonymizing control system 100 may be on a networked system such that multiple computer systems are used. For example, storage device 130 can be a redundant array of independent disks ("RAID") array or another database computer system separate from anonymizing control system 100. In some embodiments including a network, the network can be any type of network (e.g., a local area network (LAN), a wide area network (WAN), a virtual network, a cloud network, a telecommunications network) implemented as a wired network and/or wireless network.

Input devices 115 can be, for example, a keyboard, a mouse, a scanner, and/or any other suitable input device. Input devices 115 can be hard-wired or wireless. Input devices 115 can include multiple input devices (e.g., a keyboard and a mouse).

Display 120 can be any suitable monitor for displaying static or dynamic images. In some embodiments, display 120 can be a touch screen. In some embodiments, display 120 can include multiple monitors.

Memory 125 can be, for example, a random access memory ("RAM"), a read-only memory ("ROM"), a memory buffer, a flash memory, a hard drive, a database, an erasable programmable read-only memory ("EPROM"), an electrically erasable read-only memory ("EEPROM"), and/or so forth. While FIG. 1 depicts a single memory, in some embodiments multiple memory devices including combinations of different types of memory can be used. In some embodiments, the memory 125 stores instructions to cause the processor to execute modules, processes and/or functions associated with anonymizing control system 100. In some embodiments, as shown in FIG. 1, memory 125 can include an operating system 165 and anonymizing system software 145.

Operating system 165 can include any suitable operating system for use on anonymizing control system 100. Some examples of common computer operating systems include Windows® and Linux®. In some embodiments, the operating system 165 for anonymizing control system 100 can be a server operating system such as Windows Server® 2012. In other embodiments, the operating system 165 for anonymizing control system 100 can be a personal computer operating system such as Windows® 8.

Anonymizing system software 145 can include executable program instructions conceptualized as functional modules, including aliasing module 150, storage and association module 155, and output module 160. While the functional modules listed can be used, the anonymizing system software 145 can include more or fewer modules.

Aliasing module 150 can be used to produce an alias for the PII. The PII can take many forms, including without limitation, a name, address, telephone number, email address, account handle, and/or any other information that can be used to identify a subject. In some embodiments, more than one alias can be produced for a subject. For example, if the known PII for a subject includes name, telephone number and email address, the aliasing module 150 can produce a name alias, a telephone number alias, and an email address alias. In some instances, an alias can be produced for a subject even without the underlying PII. For example, aliasing module 150 can produce a name alias and a telephone number alias for a subject for which only a telephone number is known.

Storage and association module 155 can be used to store data and associate the alias with the PII. For example, storage and association module 155 can store the PII and the alias in one or more database tables as described further herein.

Output module 160 can be used to output the alias. For example, output module 160 can send a signal representing the alias information to display 120 such that the alias information is displayed, as described further herein.

Storage device 130 can be, for example, hard disk drives, storage arrays, network-attached storage, tape-based storage, optical storage, flash-memory-based storage, and/or any other suitable storage for use in anonymizing control system 100. While FIG. 1 depicts a single storage device 130, multiple storage devices may be present in some embodiments. Storage device 130 can store, for example, a database, a system of files, and/or any other suitable file. Referring now to FIGS. 2A-2F, storage device 130 can include the database tables depicted.

Figure 2A:
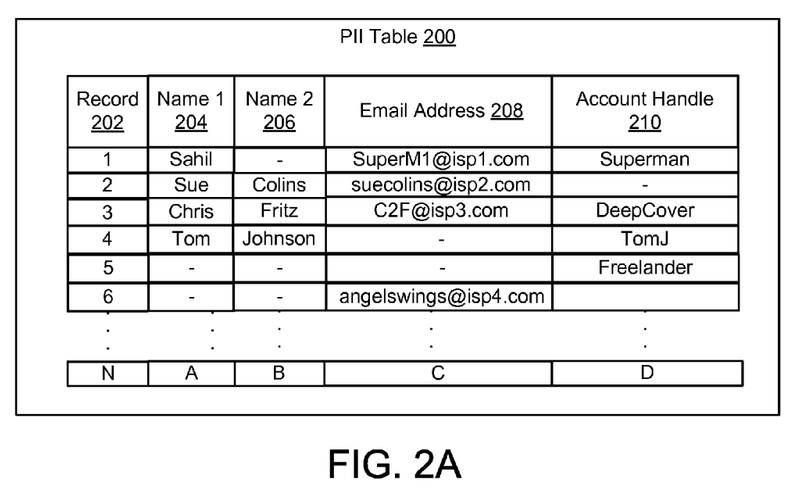
FIGS. 2A-2F illustrate database tables for use in the anonymizing control system of FIG. 1.

FIG. 2A illustrates a table that can be stored in storage device 130. The PII table 200 can store PII. PII table 200 can include fields for each type of PII. For example, FIG. 2A depicts a table that includes a record number 202, a first name field 204, a second name field 206, an email address field 208, and an account handle field 210. In some embodiments, a PII table can include other fields, such as a home address, and/or more or fewer fields.

Each record in PII table 200 (e.g., each row) can include PII for a single subject, as depicted in FIG. 2A. In some instances, each record can include a single piece of PII (e.g., an email address as shown in the sixth record of PII table 200). In other instances, each record can include multiple pieces of PII (e.g., names and an account handle as shown in the fourth record of PII table 200). In some instances, each record 202 can include different types of PII, depending on the known and/or inferred information about the subject for which the data is stored in that record. For example, the PII table 200 depicted in FIG. 2A includes records with multiple pieces of PII (i.e., the first, second, third, and fourth records) and records with a single piece of PII (i.e., the fifth and sixth records). In some embodiments, more or fewer fields can be included in a PII table. For example, in some embodiments an account handle is not present. In other embodiments, in addition to the name fields 204, 206, email address field 208, and account handle field 210, as shown in FIG. 2A, other fields can be included, including, for example, an age field, gender field, address field, and so forth.

Figure 2B:
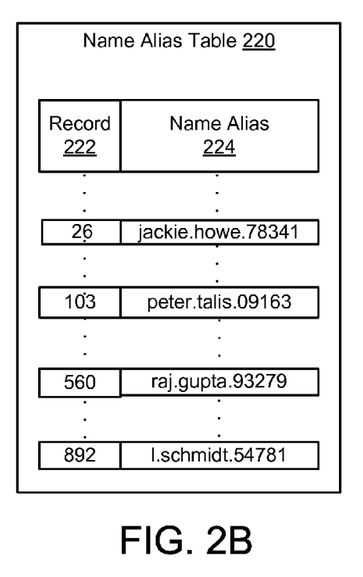

FIG. 2B illustrates a name alias table 220 that can be stored in storage device 130. The name alias table 220 can be a storage table for the name alias information. Name alias table 220 can include a field for record number 222 and a field for the name alias 224. Each record 222 in the name alias table 220 can be a name alias 224 assigned to represent the name 204, 206 of a subject listed in the PII table 200. In some instances, a name alias 224 is not produced for a subject whose name is unknown. In other instances, a name alias 224 can be produced for each subject having a record in the PII table 200.

Figure 2C:
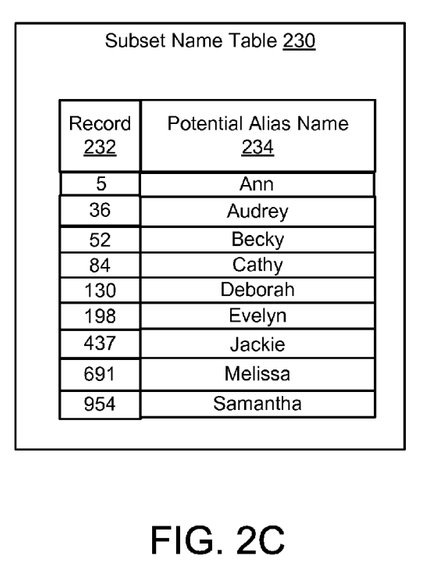

FIG. 2C illustrates a pre-populated subset name table 230 that can be stored in storage device 130. Subset name table 230 can be produced by the aliasing module 150 from a pre-populated name table of potential aliases (not shown). Subset name table 230 can include a record number field 232 that contains the corresponding record number from the pop-populated name table of potential aliases (not shown) and a potential alias name field 234. While the name table of potential aliases (not shown) can be thousands of records, the pre-populated subset name table 230 can include fewer potential alias names 234. For example, FIG. 2C depicts nine potential alias names 234. A subset name table 230 can be generated for each subject for whom an alias can be produced. In some embodiments, more or fewer than nine potential alias names can be generated. In some embodiments, the name aliases can be produced without selection from a pre-populated name table of potential aliases.

Figure 2D:
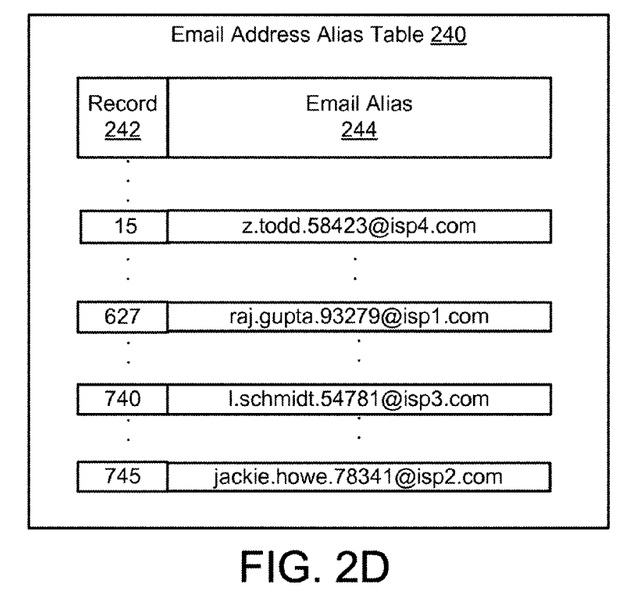

FIG. 2D illustrates an email address alias table 240 that can be stored in storage device 130. Email address alias table 240 can include a record number field 242 and an email alias field 244. In some instances, an email alias 244 can be stored in the email address alias table 240 for each subject that has PII that includes an email address.

Figure 2E:
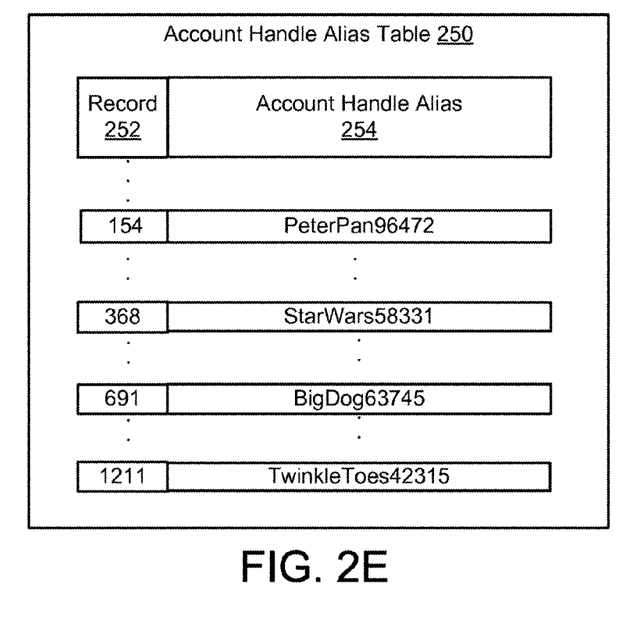

FIG. 2E illustrates an account handle alias table 250 that can be stored in storage device 130. Account handles can be used on many forum websites and/or social media websites (e.g., Facebook®, Twitter®, and so forth). In some instances, an account handle can be a user name. In some instances, the account handle alias table 250 can store an account handle alias 254 for each subject's account handle listed in PII table 200. Account handle alias table 250 can include a record number field 252 and an account handle alias field 254.

Figure 2F:
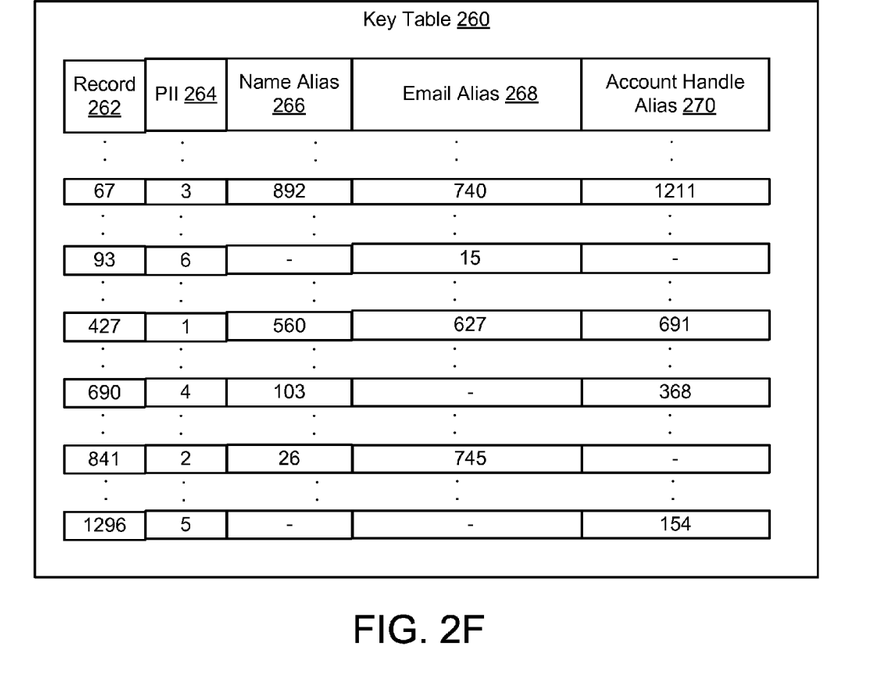

FIG. 2F illustrates a key table 260 that can be stored in storage device 130. In some embodiments, the key table 260 can store the key information that identifies the PII in the PII table 200 that corresponds to the alias information in the name alias table 220, email address alias table 240, the account handle alias table 250, and any other alias tables included but not depicted. The key table 260 can include a record number field, a PII field 264, a name alias field 266, an email alias field 268, an account handle alias field 270 and/or any other field to map additional aliases to the PII stored in PII table 200.

In use, anonymizing control system 100 can obtain data, including PII, from any one or more suitable sources (e.g., a social networking source, a private government source, a corporate system source, and so forth). The PII can be in the form of structured data (e.g., name, telephone number, and address, labeled as such), and/or in the form of unstructured data (e.g., a comment field that includes a subject's name and telephone number). In the case of unstructured data, the PII can be categorized from the unstructured data for use in the anonymizing control system 100. Processor 105 can call anonymizing system software 145 to anonymize the PII.

Storage and association module 155 can store the PII in the PII table 200 on storage device 130. For example, storage and association module 155 can store the name for each subject for which PII was obtained in the one or more name fields in the PII table 200. Similarly stated, for example, a subject's first name can be stored by storage and association module 155 into a first name field in PII table 200 on storage device 130 (e.g., the first record or row of PII table 200 contains "Sahil" in the first name field 204).

Aliasing module 150 can produce an alias for each type of PII stored in the second table 136. As described above, PII can include a name, address, telephone number, social security number, email address, account handle, company identification number and/or any other information that can be used to identify the subject.

As discussed above, a subject's name can be anonymized. Many individuals in the U.S. have multiple names, including a first name, last name, and middle name. In other countries, more or fewer than three names can be standard. In some embodiments, aliasing module 150 can use known or inferred characteristics of the subject to choose an alias for each name (e.g., first and last name) of the subject. For example, if the subject is female, aliasing module 150 can produce a female name alias 224. Similarly, the ethnicity of the subject can be used to select a suitable name alias 224. For example, the first record in the PII table 200 contains a first name 204 of "Sahil." Sahil is an Indian name, so aliasing module 150 can produce an alias that accounts for that characteristic. In the depicted example, the name alias 224 produced by aliasing module 150 is "raj.gupta.93279" for the subject with PII in PII table 200 in the first record. Similarly stated, the subject's first name, "Sahil," is an Indian name for males, so a male, Indian alias, "Raj Gupta," was selected. In some embodiments, if the known characteristics are insufficient to determine an appropriate name, an initial can be used. For example, the third record in PII table 200 contains a first name "Jordan" and no other information that can lead to a gender determination because Jordan is a unisex name. The name alias produced by aliasing module 150 for the subject identified in the third record of PII table 200 can be "1.schmidt.54781." In other embodiments, a default other than an initial can be used. For example, the default can be male names, unisex names, or any other suitable alternative. Similarly stated, the first name alias selected by aliasing module 150 for a subject with the first name "Ashley" (i.e., a unisex name) can be "Taylor" (i.e., another unisex name) if the default is to select a unisex name for a subject when the subject's gender is unknown.

In some embodiments, characteristics of a subject can be collected and added to the PII table 200, even if the information is not originally supplied to the anonymizing system software 145. As discussed above, for example, a gender can sometimes be determined based on the name of the subject. Additionally, a subject's name can sometimes be used to infer the subject's age. For example, "Jennifer" was most common as a girl's name in the 1970s. If, therefore, the subject's name is "Jennifer," aliasing module 150 can infer a birth date in the U.S. in the 1970s for that subject. The inferred birth date can be added by storage and association module 155 to the subject's PII in PII table 200. In some embodiments, PII or characteristic data that is inferred about a subject can be overwritten by PII or characteristic data that is more reliable. For example, if a subject's birth date is inferred, as described above, and later the subject's birth date is retrieved from a new source (e.g., a new user profile on a social media website), the birth date that is retrieved from the new source can overwrite the subject's birth date that was inferred.

As another example of inferring characteristics, a subject's address can be used to infer educational level, income level, ethnicity, age and so forth. For example, if a subject's address indicates that the subject lives in a retirement community, the subject's age can be inferred as over 60 years old. Similarly, if the subject's address is in an area that has a high population of 20- to 30-year old technical professionals (e.g., Silicon Valley), the subject's age can be inferred as 30. As another example, a subject's ethnicity can be inferred to be Chinese if the subject's address is in an area that is overwhelmingly populated with Chinese individuals.

The inferred characteristics can be used to produce an alias based on the characteristics as described herein.

Additionally, if an account handle has a user profile associated with the user handle (e.g., a Twitter® account), the user profile can indicate other information about the subject, such as gender, geographic region, and/or any other information about the subject entered in the user profile. If the user profile is publicly available, profile information can be collected by storage and association module 155 and stored in PII table 200 in the same record with the subject's other PII. An account handle can also be associated with social media correspondence that can include information about the subject. For example, a social media correspondence (e.g., a Facebook® post) can include the subject's email address. Anonymizing system software 145 can collect the subject's email address, identify it as the email address associated with a given subject, and include it in the PII table 200 with the subject's other PII. As another example, aliasing module 150 can collect social media correspondence, analyze the content of the communication, and match the terminology and/or slang used in the communication to a particular generation. For example, a subject's birth date (i.e., generation) can be inferred to be in the 1950s if the subject's social media correspondence uses, for example, the terms "groovy," "boogie," and/or "gnarly" because those terms were popular with young people in the 1960s. Similarly, a subject's birth date (e.g., generation) can be inferred to be the 1990s if the subject's social media correspondence uses, for example, the terms "peeps," "epic fail," and/or "sweet" because those terms were popular with young people in the 2000s. In some embodiments, a database populated with common slang and/or terminology can be used to identify the subject's generation. For example, aliasing module 150 can compare the language in the communication with the database table to identify an inferred generation for the subject. Storage and association module 150 can store the inferred generation (i.e., age) information in the subject's PII record in PII table 200.

In some embodiments, aliasing module 150 can select multiple records from a pre-populated name table of potential aliases that match the known and/or inferred characteristics of the subject. Similarly stated, aliasing module 150 can generate a subset of potential alias names 234 from which to choose. For example, aliasing module 150 can select the records 232 shown in FIG. 2C containing the potential alias names 234 as the subset name table 230 for anonymizing the first name 204 of the second record in the PII table 200. Similarly stated, the aliasing module 150 can select the subset of potential alias names 234 shown in FIG. 2C for the first name 204 "Sue." Because "Sue" is typically a female name, abasing module 150 can deduce that a female name should be used for the alias. Aliasing module 150 can randomly select one of the potential alias names 234 from the pre-populated subset name table 230 that has been pre-populated with female names. In the example depicted, aliasing module 150 selected "Jackie" as the first name alias. Aliasing module 150 can select a subset of potential alias names using known and/or inferred characteristics of the subject for each remaining name. Aliasing module 150 can append the names, separated by a period. To ensure uniqueness, aliasing module 150 can generate a random numeric or alphanumeric value to append to the name alias. In the example depicted, the name "Sue Colins" can be aliased to "jackie.howe.78341."

In some embodiments, the pre-populated name table of potential aliases can include information regarding characteristics of the potential aliases that make a potential alias suitable for a subject's name. For example, the pre-populated name table can include information on the generation the name was popular and/or which ethnicity for which the name is suitable. The subset name table 230 can then be populated with potential alias names 234 for the subject that corresponds to the inferred characteristics. Similarly stated, if the subject's name is "Jennifer," as described above, "Jennifer" was most popular as a girl's name in the U.S. in the 1970s. The subset name table 230 can then be populated with other female names that were popular in the U.S. in the 1970s (e.g., Amy, Melissa, Michelle, Kimberly, Lisa, and so forth). The characteristics of potential aliases can be collected from any reliable source. For example, the U.S. Social Security Administration publishes lists of top names for each decade for each gender. In some instances, the subject's characteristics can be known rather than inferred. In that instance, the known characteristics can be used rather than inferred characteristics. For example, anonymizing system software 145 can collect information about a subject with the name "Jennifer" and birth date "May 26, 1954." Aliasing module 150 can populate the subset name table 230 with female names that were popular in the 1950s rather than the 1970s.

One significant advantage to this aliasing technique is that the resulting name alias includes a name that an analyst can recognize when analyzing multiple records. In a redaction system, no name would be visible because it is fully redacted. In an encryption system, the encrypted name "Sue Colins" can be "3uf!a76W421zzp"—a mixture of various characters with no inherent meaning to an analyst. An analyst can have a difficult time recognizing the alphanumeric string generated by encryption when analyzing multiple records because the alphanumeric string does not resolve to a word or words that an analyst can recognize as a typical name. "Jackie Howe," however, are words that an analyst can recognize as a typical name. Similarly stated, an analyst looking at multiple analyses containing "Jackie Howe" can have a far easier time noticing the commonality of the name between the analyses than if the analyst were to observe "3uf!a76W421zzp" across the same analyses.

Aliasing module 150 can produce, for example, an alias for a subject's email address. An email address can be in the form "account_name@email_provider.com." Aliasing module 150 can use the unique name alias 224 as the aliased account name in substitution of the email address. In some embodiments, aliasing module 150 can retain the email provider. For example, the second record in PII table 200 contains the first name "Sue," last name "Colins," and email address "suecolins@isp2.com." The account name, "suecolins" can be aliased to "jackie.howe.78341" because that is the name alias 224 for that subject as described above. The email address alias can be "jackie.howe.78341@isp2.com." In other instances, a completely different account name can be produced and/or the email provider can be abased as well. In some embodiments, characteristics of the subject can be used to produce an appropriate account name.

Aliasing module 150 can also produce, for example, an alias for a subject's account handle. As described above, an account handle can be a user name on a website forum, social media website, and/or any other online system. In some instances, an appropriate account handle can be selected based on known characteristics of the subject. In other instances, an account handle can be randomly generated and/or selected. For example, the fifth record in the PII table 200 contains only an account handle 210. Because little is known about that subject, an account handle 210 can be randomly generated. In that example, the account handle 210 "Freelander" can be aliased to "PeterPan96472."

Aliasing module 150 can also produce, for example, an alias for a subject's telephone number. Throughout the world, telephone numbers have a varying number of digits. For example, while telephone numbers in the US are 10 digits, telephone numbers in many European countries vary in length depending on the country one is calling or the type of telephone number (e.g., landline number or mobile number). Producing an alias for the last four digits of a telephone number can provide the necessary anonymity and uniqueness of the aliased telephone number when the aliased last four digits are combined with the remainder of the original telephone number. The PII remains protected because by aliasing the last four digits of the subject's telephone number, there are 10,000 (i.e., $10^4$) possible telephone numbers that the aliased telephone number could be. In some embodiments, aliasing module 150 can generate a random, alphanumeric four-character value. Aliasing module 150 can remove the last four digits of the original telephone number and append the generated value to produce the aliased telephone number. For example, aliasing module 150 can generate a telephone number alias of "303-981-A73B" for a subject's telephone number of "303-981-1697." An analyst seeing the alias "303-981-A73B" would be able to recognize that the telephone number is a Denver area mobile telephone because the 303 area code corresponds to Denver and the 981 code is a Verizon mobile designator. The analyst, therefore, would be able to extract significant insight from the aliased telephone number while the subject's PII remained protected. In some embodiments, the additional descriptive data can be generated by anonymizing system software 145. For example, using the above example telephone number of "303-981-1697," the aliasing module can determine the geographic location is "Denver" and the telephone type is "mobile." Storage and association module 155 can store the geographic location and telephone type with the subject's PII in storage device 130.

Aliasing module 150 can produce, for example, an alias for a subject's address. Producing an alias for the street number and name can provide the necessary anonymity and uniqueness of the aliased address when the aliased street name and number are combined with the city, state, country and zip code of the subject. For example, aliasing module 150 can generate a random, alphanumeric eight-character value. Aliasing module 150 can replace the street name and number of the original address with the generated value and retain the city, state, country, and zip code to produce the aliased address. For example, aliasing module 150 can generate an address of "Q32YAC80, Colorado Springs, Colo. 80903" for a subject's address of "505 Wellington, Colorado Springs, Colo. 80903." In some embodiments, portions of the address other than the street name and number can be aliased in addition to or instead of the street name and number. For example, the street name (i.e., Wellington) can be retained while the street number is aliased. Similarly stated, any portion of the address can be aliased such that the PII is sufficiently protected.

While aliasing for name, address, email address, telephone number, and account handle are explained in detail above, aliasing module 150 can produce an alias for any type of PIT. For example, an employee identification number or a social security number can be aliased in a way similar to aliasing a telephone number. For example, the last four characters of the subject's employee identification number can be replaced with a randomly generated numeric or alphanumeric value to produce an employee identification alias. Similarly, the last four digits of the subject's social security number can be replaced with a randomly generated numeric or alphanumeric value to produce a social security number alias.

Storage and association module 155 can store the produced alias information in the appropriate table. Storage and association module 155 can, for example, store the name alias 224 in the name alias table 220. Storage and association module 155 can also associate the aliases with the PII in the key table 260. For example, the $690^{th}$ record of key table 260 is associated with the fourth record in the PII table 200 because PII field 264 contains a "4." The name alias field 266 contains a "103," so the $103^{rd}$ record in the name alias table 220 is the name alias associated with the subject of the fourth record in PII table 200. The subject's name, "Tom Johnson," can be aliased to "peter.talis.09163." Because the PII table 200 does not contain an email address, no email address alias was produced and there is no number associated in the email alias field 268 in the key table 260. The account handle alias field 270 contains a 368, so the account handle alias produced was "StarWars58331," which is the account handle alias 254 entry in the account handle alias table 250.

Output module 160 can send the alias information to display 120 for analyst use. The analyst can, in some embodiments, use input devices 115 to communicate with processor 105 to select the desired data, request desired data, and/or make modifications to the tables in storage device 130.

While FIGS. 2A-2F depict database tables for the storage of data, in some embodiments the data depicted in one or more of the tables could be stored in RAM, in a data file, and/or in any other suitable storage. In some instances, for example, the data depicted in the subset name table 230 can be stored in RAM. Additionally, while the database tables depicted in FIGS. 2A-2F describe an embodiment, in other embodiments more or fewer database tables can be used. For example, the PII table 200 can include each subject's PII as well as all aliases associated with the PII, resulting in a single database table rather than the multiple tables depicted.

An advantage of using a substitution system (i.e., anonymizing control system 100) is security. Where data that is encrypted can be decrypted by a computer hacker, a substitution scheme cannot be decrypted. For example, an unauthorized user that obtains an aliased name has no way, without access to the data (e.g., the PII, alias, and key tables) to recreate the subject's name. Furthermore, randomization of the selection of the alias information from a subset of potential aliases results in a different alias each time. For example, if "John" were aliased two times (e.g., by aliasing module 150), the first time the resulting alias can be "timothy" and the second time the resulting alias can be "joseph." Similarly, a last name aliased two times can result in two different last name aliases. A specific subject's alias, however, will always be returned for that subject. For example, if "John Smith," a subject with email address "john@isp5.com," had a name alias assigned of "timothy.peters.56972," any subsequent aliasing on that subject's name would return "timothy.peters.56972." The only way, therefore, for an unauthorized user to determine the PII of a subject is to have unauthorized access to the source data or the aliasing system. The source data and aliasing system can be protected, for example, through advanced cyber security.

Figure 3:
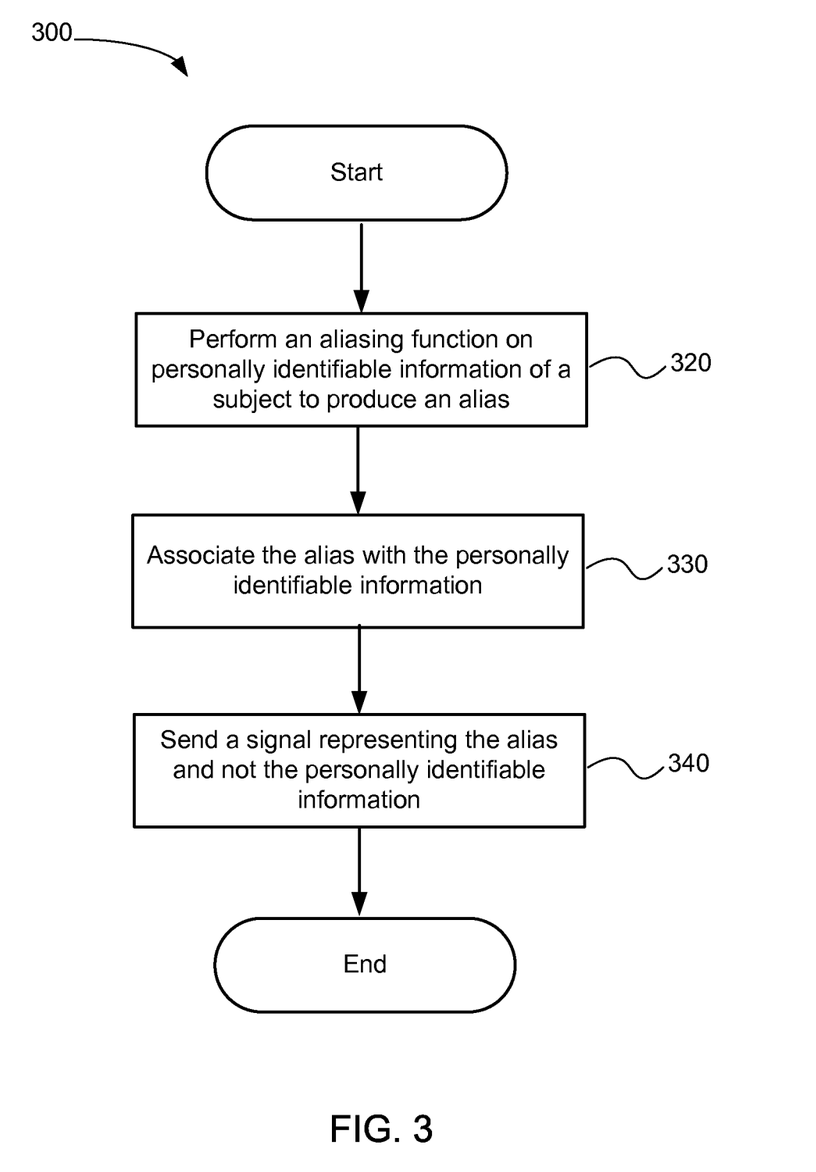
FIG. 3 illustrates a flowchart of a method for anonymizing personally identifiable information, according to an illustrative embodiment.

FIG. 3 is a flowchart of a method 300 for producing an alias, according to an embodiment. At 320, an aliasing function can be performed on the PII of a subject to produce an alias. For example, the aliasing function can be performed by aliasing module 150. At 330, the alias can be associated with the PII. For example, storage and association module 155 can associate the alias with the PII. At 340, a signal representing the alias rather than the PII can be output, for example, by output module 160. While described with respect to the above figures as a database system, any other storage system can be used to store and associate the data.

In some embodiments, descriptive data can be generated based on the personally identifiable information. For example, as described above, the subject's name can sometimes indicate the gender of the subject. Another example is that a subject's telephone number can indicate the subject's general geographic location. In some embodiments, the anonymizing system software 145 can generate descriptive data and associate the descriptive data with the PII for that subject. For example, the descriptive data can be stored in PII table 200 in the record for that subject. In some embodiments, the descriptive data can be returned by output module 160 with the alias information to the user and/or in any generated output.

Figure 4:
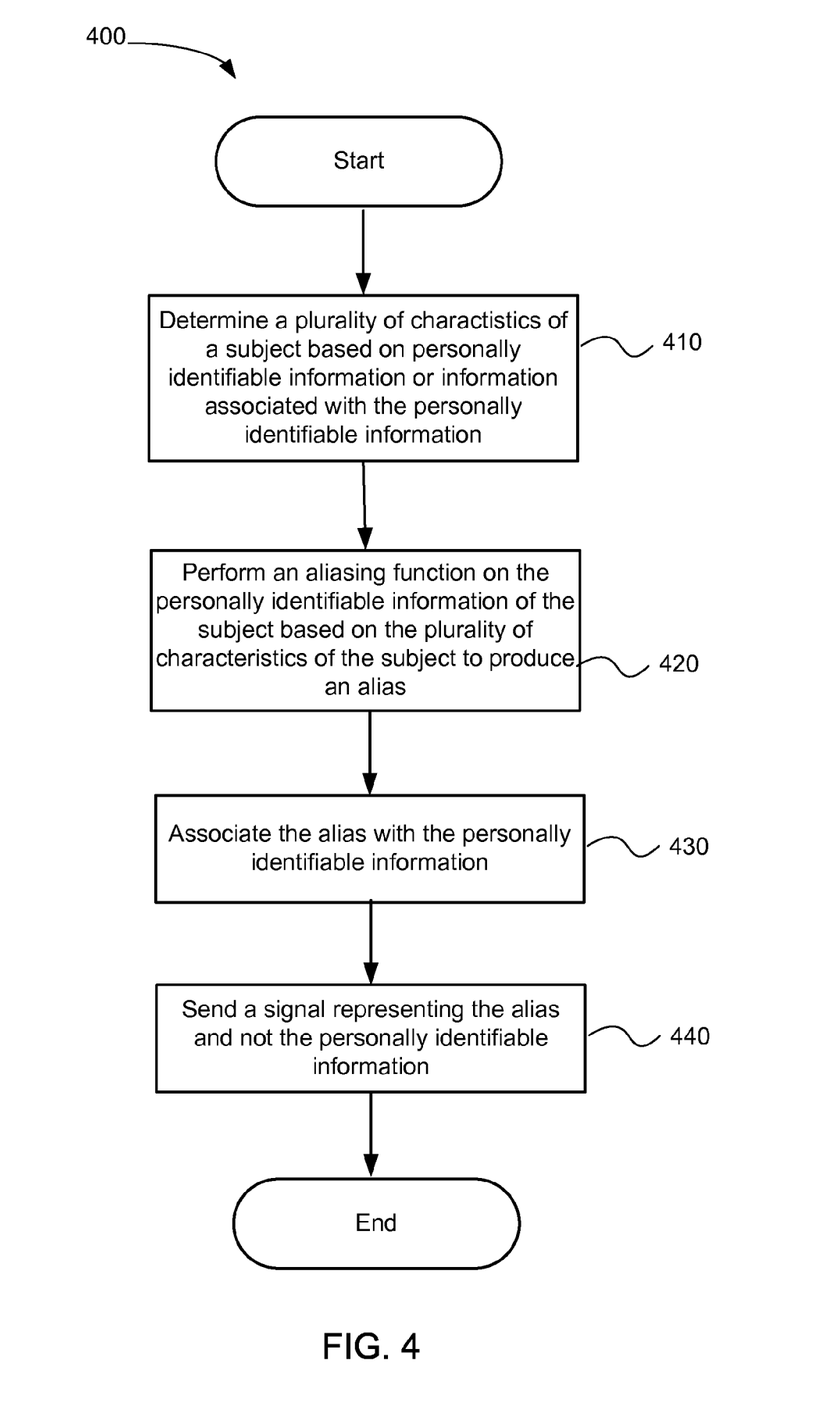
FIG. 4 illustrates a flowchart of a method for anonymizing personally identifiable information, according to another illustrative embodiment.

FIG. 4 is a flowchart of a method 400 for producing an alias, according to an embodiment. At 410, a plurality of characteristics of a subject can be determined based on PII or information associated with the PII of the subject. The plurality of characteristics can be determined by, for example, aliasing module 150. As an example, a subject's telephone number is PII, and even if the subject's PII does not include an address, a subject's geographic location can be determined based on the subject's telephone number, as described above. As a further example, in some instances, the subject's gender or age can be determined based on the subject's name.

As described above, the PII can have information associated with it that includes characteristics about the subject. For example, a social media site for which the subject has an account handle and a user profile can contain information in the user profile that contains characteristics of the subject. For example, the user profile can contain age information, address information, gender information, and so forth.

At 420, an aliasing function can be performed on the PII of the subject based on the plurality of characteristics of the subject to produce an alias. For example, an address can be PII, and the geographic location of the subject (e.g., derived from the subject's telephone number) can be used to select an appropriate name alias. Similarly stated, a Chinese name alias can be selected for a subject located in China. As another example, the subject's age (e.g., retrieved from the user profile associated with the subject's account handle) can be used to select a name alias appropriate for that use. For example, the alias chosen for a male subject who has a birth date in 1925 and is located in the U.S. can be "Robert" or "John" (i.e., names that were popular for males in the U.S. in the 1920s according to the U.S. Social Security Administration) rather than "Tyler" or "Noah" (i.e., names that were popular in the 2000s, but that do not show up on the list of the top 200 most popular names of the 1920s according to the U.S. Social Security Administration).

At 430, the alias can be associated with the PII. For example, storage and association module 155 can associate the alias with the PII. At 440 a signal representing the alias rather than the PII can be can be output, for example, by output module 160.

Figure 5:
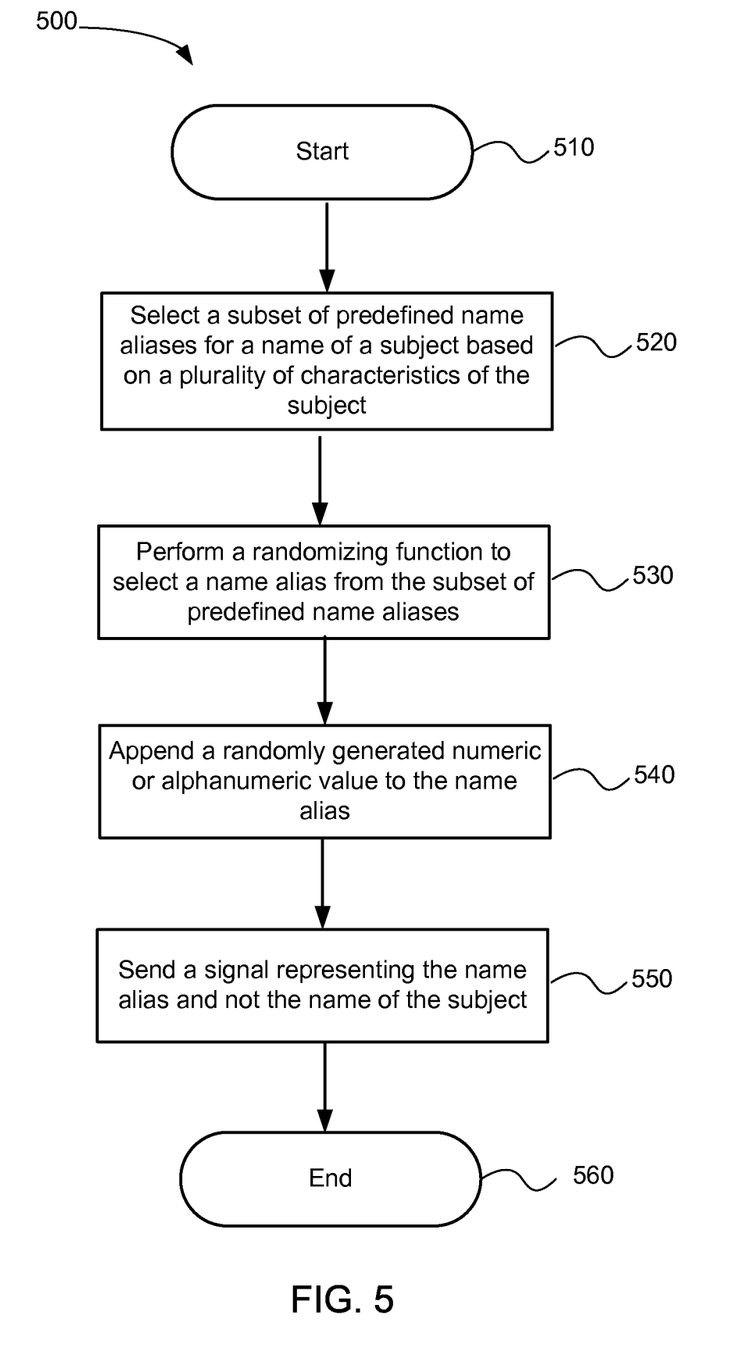
FIG. 5 illustrates a flowchart of a method for anonymizing a name, according to an illustrative embodiment.

FIG. 5 is a flowchart of a method 500 for producing a name alias, according to an embodiment. At 520, a subset of names can be selected from a predetermined set of potential name aliases based on characteristics of the subject. For example, aliasing module 150 can select the subset of names as described above with respect to FIG. 2C. At 530, a randomizing function can be performed to select a name alias from the subset of predefined name aliases. For example, aliasing module 150 can perform the randomizing function. At 540, a random numeric or alphanumeric value can be generated and the random value can be appended to the selected alias from 530. The result can be an alias name similar to the alias names in FIG. 2B. At 550, the alias can be output, for example, by output module 160. For example, output module 160 can send the alias to display 120. For another example, output module 160 can generate a report, graph, and/or any other suitable output for analyst use.

In some embodiments, a subject can have multiple names (e.g., a first name and a last name). A subset of names can be generated, as described above, for each name of the subject. The names can be joined (e.g., by a period), and the random value can be appended to the joined names. The result can be an alias name for output, for example, by output module 160.

Figure 6:
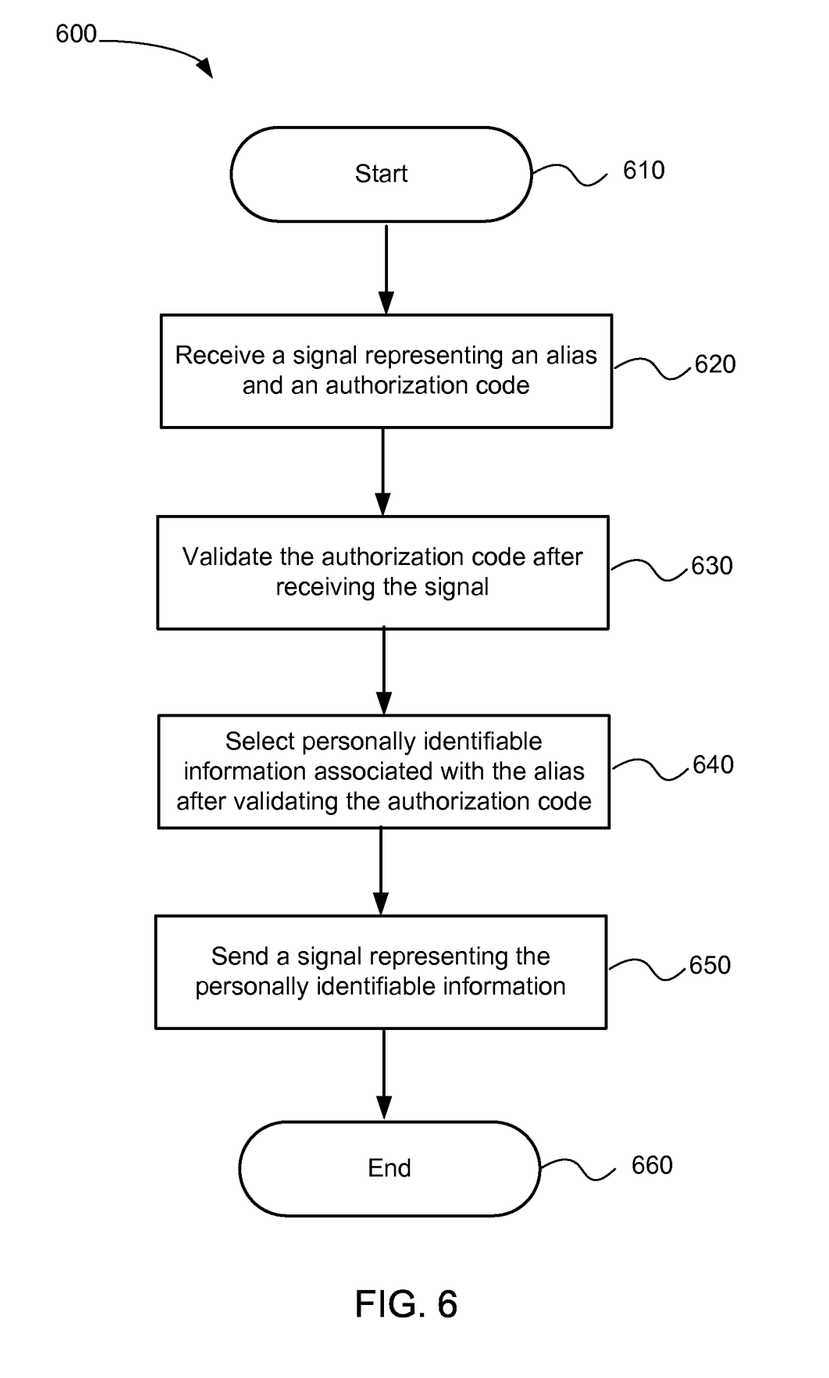
FIG. 6 illustrates a flowchart of a method for deanonymizing personally identifiable information, according to an illustrative embodiment.

FIG. 6 is a flowchart of a method 600 for producing the PII associated with an alias, according to an embodiment. In some embodiments, an analyst can enter an alias and an authorization code. An authorization code can be used before allowing the reversal of the aliasing to protect the PII. At 620 and 630, the authorization code can be received and validated, for example, by aliasing module 150. If the authorization code validates, the PII associated with the alias can be retrieved, for example, by aliasing module 150. As an example, if the alias entered from the example in FIGS. 2A-2F is "z.todd@isp4.com," the returned PII can be "angelswings@isp4.com." At 650, the PII (e.g., "angelswings@isp4.com") can be sent to the user (e.g., through display 120), for example, by output module 160.

In some embodiments, the authorization code can be issued using a formal approval process. For example, the user can request an authorization code for deanonymizing aliases (e.g., through anonymizing control software 145). The request can be approved by, for example, a chain of command and/or legal review. In some instances, the request for the authorization code can include a request for an authorization code that allows the user to deanonymize any alias. In other instances, the request for the authorization code can be a request for an authorization code that allows the user to deanonymize one or more specific aliases. For another example, users can have accounts in the anonymizing control system 100, and the user can be granted authorization to deanonymize any alias or to deanonymize one or more specific aliases when the user's account is created.

In some embodiments, the production of the PII based on an alias and a validation code can be logged. As described with respect to FIG. 6, the PII can be retrieved and provided to the user after validating the authorization code. Additionally, the authorization code and alias with a date time stamp can be logged in a log file by, for example, output module 160. The logging can allow analysts to identify unauthorized access to PII.

It is intended that some of the methods and apparatus described herein can be performed by software (stored in memory and executed on hardware), hardware, or a combination thereof. For example, the aliasing module can be performed by such software and/or hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, C#, Java™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes, Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring in certain order, the ordering of certain steps may be modified. Additionally, certain steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A non-transitory processor-readable medium storing code representing instructions to be executed by a processor, the code comprising code to cause the processor to:
   perform an aliasing function on personally identifiable information of a subject to produce an alias for at least one piece of personally identifiable information, wherein the personally identifiable information includes a first name and a last name and the aliasing function includes:
      identifying, based at least in part on the personally identifiable information of the subject, a plurality of characteristics of the subject including a gender of the subject and an ethnicity of the subject,
      selecting an aliased first name based on the gender of the subject and the ethnicity of the subject, the aliased first name having a recognizable string of characters, and
      selecting an aliased last name based on the ethnicity of the subject, the aliased last name having a recognizable string of characters;
   associate the alias for the at least one piece of personally identifiable information including the aliased first name and the aliased last name with the personally identifiable information; and
   send a signal including the alias for the at least one piece of personally identifiable information and not the personally identifiable information.

2. The non-transitory processor readable medium of claim 1, further comprising code to cause the processor to:
   generate descriptive data based on the personally identifiable information;
   associate the descriptive data with the personally identifiable information, wherein sending the signal including the alias for the at least one piece of personally identifiable information includes sending the descriptive data.

3. The non-transitory processor readable medium of claim 1, wherein the personally identifiable information includes a full name including the first name and the last name, and the aliasing function includes:
   generating a random numeric or alphanumeric value; and
   appending the random value to the combined aliased first name and aliased last name to produce an aliased full name.

4. The non-transitory processor readable medium of claim 1, wherein the plurality of characteristics of the subject include a period of popularity of the first name and wherein the selecting the aliased first name is further based on the period of popularity.

5. The non-transitory processor readable medium of claim 1, wherein the personally identifiable information includes a telephone number of the subject, and the aliasing function includes:
   generating a string of four alphanumeric characters;
   substituting the string of four alphanumeric characters for the last four digits of the telephone number; and
   appending the substituted string of four alphanumeric characters to the remainder of the telephone number to produce an aliased telephone number.

6. The non-transitory processor readable medium of claim 1, wherein the personally identifiable information includes an email address of the subject, the email address includes an email provider and an account name, and the aliasing function includes:
   selecting an aliased account name based on the plurality of characteristics of the subject;
   and
   appending the email provider to the aliased account name to produce an aliased email address.

7. The non-transitory processor readable medium of claim 1, wherein the personally identifiable information includes an account handle of the subject, and the aliasing function includes selecting an aliased account handle based on the plurality of characteristics of the subject.

8. The non-transitory processor readable medium of claim 1, wherein the personally identifiable information includes an address of the subject, and the aliasing function includes:
   selecting an aliased street name and an aliased street number of the address;
   and
   appending a city, a state, and a zip code of the address of the subject to the aliased street number and aliased street name to produce an aliased address.

9. The non-transitory processor readable medium of claim 1, wherein the plurality of characteristics of the subject are identified based at least in part on information associated with the personally identifiable information.

10. The non-transitory processor readable medium of claim 9, wherein the information associated with the personally identifiable information includes at least one of a geographic location of the subject, a social media profile of the subject, or social media correspondence of the subject.

11. The non-transitory processor readable medium of claim 9, wherein the information associated with the personally identifiable information includes information from government records.

12. The non-transitory processor readable medium of claim 1, wherein:
the personally identifiable information of the subject is obtained from a social networking source that includes personally identifiable information for a plurality of subjects,
the non-transitory processor readable medium further comprising code to cause the processor to:
repeat the perform an aliasing function instruction, associate the alias with the personally identifiable information instruction, and send a signal instruction for multiple subjects in the plurality of subjects.

13. The non-transitory processor readable medium of claim 1, wherein:
the personally identifiable information of the subject is obtained from a private government source that includes personally identifiable information for a plurality of subjects,
the non-transitory processor readable medium further comprising code to cause the processor to:
repeat the perform an aliasing function instruction, associate the alias with the personally identifiable information instruction, and send a signal instruction for multiple subjects in the plurality of subjects.

14. The non-transitory processor readable medium of claim 12, wherein:
the personally identifiable information of multiple subjects from the plurality of subjects includes personally identifiable information contained in unstructured data,
the non-transitory processor readable medium further comprising code to cause the processor to:
identify the personally identifiable information in the unstructured data for multiple subjects from the plurality of subjects.

15. A computer-implemented method, comprising:
performing, using one or more processors of a computer system, an aliasing function on personally identifiable information of a subject to produce an alias for at least one piece of personally identifiable information, wherein the personally identifiable information includes a first name and a last name and the aliasing function includes:
identifying, based at least in part on the personally identifiable information of the subject, a plurality of characteristics of the subject including a gender of the subject and an ethnicity of the subject,
selecting an aliased first name based on the gender of the subject and the ethnicity of the subject, the aliased first name having a recognizable string of characters, and
selecting an aliased last name based on the ethnicity of the subject, the aliased last name having a recognizable string of characters;
associating, using the one or more processors, the alias for the at least one piece of personally identifiable information including the aliased first name and the aliased last name with the personally identifiable information; and
sending a signal, using the one or more processors, including the alias for the at least one piece of personally identifiable information and not the personally identifiable information.

16. The computer-implemented method of claim 15, wherein the personally identifiable information includes a full name including the first name and the last name, and the aliasing function includes:
generating a random numeric or alphanumeric value, and
appending the random value to the combined aliased first name and the aliased last name to produce an aliased full name.

17. The computer-implemented method of claim 15, wherein the plurality of characteristics of the subject are identified based at least in part on information associated with the personally identifiable information, the information associated with the personally identifiable information including at least one of a geographic location of the subject, a social media profile of the subject, or social media correspondence of the subject.

18. The computer-implemented method of claim 15, wherein the plurality of characteristics of the subject include a period of popularity of the first name and wherein the selecting the aliased first name is further based on the period of popularity.

19. The computer-implemented method of claim 15, wherein the subject is a first subject from a plurality of subjects, the method further comprising:
repeating the performing an aliasing function, the associating the alias for the at least one piece of personally identifiable information, and the sending a signal step for multiple subjects in the plurality of subjects.

20. The computer-implemented method of claim 15, wherein the plurality of characteristics of the subject are identified based at least in part on information associated with the personally identifiable information including information from government records.

* * * * *

UNITED STATES PATENT AND TRADEMARK OFFICE
CERTIFICATE OF CORRECTION

PATENT NO. : 9,460,310 B2
APPLICATION NO. : 13/842242
DATED : October 4, 2016
INVENTOR(S) : Patrick David Butler, Tony Brett Marshall and Mark F. Jacobson Page 1 of 1

It is certified that error appears in the above-identified patent and that said Letters Patent is hereby corrected as shown below:

In the Specification

In Column 7, Line 51: please delete "abasing" and insert --aliasing--

In Column 8, Line 55: please delete "abased" and insert --aliased--

Signed and Sealed this
Twenty-seventh Day of March, 2018

Andrei Iancu
*Director of the United States Patent and Trademark Office*